United States Patent
Takase et al.

(10) Patent No.: US 9,190,935 B2
(45) Date of Patent: Nov. 17, 2015

(54) POWER REGENERATIVE CONVERTER AND POWER CONVERSION APPARATUS

(71) Applicant: KABUSHIKI KAISHA YASKAWA DENKI, Kitakyushu-shi (JP)

(72) Inventors: Yoshiyasu Takase, Kitakyushu (JP); Kozo Ide, Kitakyushu (JP); Shinya Morimoto, Kitakyushu (JP); Hideaki Iura, Kitakyushu (JP); Takahiro Saeki, Kitakyushu (JP)

(73) Assignee: KABUSHIKI KAISHA YASKAWA DENKI, Kitakyushu-Shi (JP)

( * ) Notice: Subject to any disclaimer, the term of this patent is extended or adjusted under 35 U.S.C. 154(b) by 135 days.

(21) Appl. No.: 13/859,732

(22) Filed: Apr. 10, 2013

(65) Prior Publication Data
US 2013/0279214 A1 Oct. 24, 2013

(30) Foreign Application Priority Data
Apr. 20, 2012 (JP) ................................ 2012-097133

(51) Int. Cl.
*H02M 5/458* (2006.01)
*H02M 7/68* (2006.01)
(Continued)

(52) U.S. Cl.
CPC *H02M 7/68* (2013.01); *H02M 5/44* (2013.01); *H02M 7/219* (2013.01); *H02M 7/797* (2013.01); *H02P 9/04* (2013.01); *H02P 21/0096* (2013.01); *H02M 1/16* (2013.01); *H02M 5/4585* (2013.01)

(58) Field of Classification Search
CPC ......... H02M 7/68; H02M 7/72; H02M 7/757; H02M 7/79; H02M 7/797; H02M 7/162–7/1626; H02M 7/217–7/219; H02M 5/44; H02M 5/45; H02M 5/4505; H02M 5/458; H02M 5/4585; H02P 21/0096; H02P 9/04

USPC .............. 363/150, 37, 46, 131, 132; 318/519, 318/400, 561, 432, 433, 700, 768, 715, 803, 318/798, 799, 801, 805, 809; 701/41, 42; 8/137; 180/443
See application file for complete search history.

(56) References Cited

U.S. PATENT DOCUMENTS 5,959,430 A * 9/1999 Yuki et al. ...................... 318/805
6,507,505 B2 * 1/2003 Oka et al. ......................... 363/47
(Continued)

FOREIGN PATENT DOCUMENTS

CN 101552572 10/2009
CN 201590764 U 9/2010
(Continued)

OTHER PUBLICATIONS

Japanese Office Action for corresponding JP Application No. 2012-097133, Mar. 18, 2014.
(Continued)

*Primary Examiner* — Jessica Han
*Assistant Examiner* — Lorena Bruner
(74) *Attorney, Agent, or Firm* — Mori & Ward, LLP (57) ABSTRACT

A power regenerative converter includes: a power conversion unit configured to convert AC power supplied from an AC power supply into DC power and convert DC power into AC power to be supplied as regenerative electric power to the AC power supply; an LCL filter including a reactor unit having a plurality of reactors connected in series between the power conversion unit and the AC power supply, and capacitors each having one end connected to a series connection point of the reactors in the reactor unit; a drive control unit for controlling the power conversion unit based on an AC voltage command; and a voltage command compensation unit for calculating a compensation value in accordance with a capacitor voltage being a voltage at the series connection point of the reactors and adding the compensation value to the AC voltage command input to the drive control unit.

13 Claims, 5 Drawing Sheets

(51) Int. Cl.
*H02M 5/44* (2006.01)
*H02M 7/219* (2006.01)
*H02M 7/797* (2006.01)
*H02P 9/04* (2006.01)
*H02P 21/00* (2006.01)
*H02M 1/16* (2006.01)

(56) References Cited

U.S. PATENT DOCUMENTS

| | | | |
|---|---|---|---|
| 6,844,700 B2 * | 1/2005 | Sakai et al. | 318/801 |
| 7,907,427 B2 * | 3/2011 | Sakakibara | H02M 5/458 363/37 |
| 2001/0048604 A1 | 12/2001 | Oka et al. | |
| 2009/0237961 A1 * | 9/2009 | Sakakibara | H02M 5/458 363/37 |
| 2009/0237964 A1 * | 9/2009 | Serpa et al. | 363/40 |
| 2013/0214717 A1 * | 8/2013 | Ishikawa | H02M 7/53875 318/503 |

FOREIGN PATENT DOCUMENTS

| | | |
|---|---|---|
| JP | 2001-286150 | 10/2001 |
| JP | 2001-286150 | * 12/2001 |
| JP | 2006-340466 | 12/2006 |

OTHER PUBLICATIONS

Chinese Office Action for corresponding CN Application No. 201310140581.4, Dec. 29, 2014.

* cited by examiner

POWER REGENERATIVE CONVERTER AND POWER CONVERSION APPARATUS

CROSS-REFERENCE TO RELATED APPLICATION

The present application claims priority under 35 U.S.C. §119 to Japanese Patent Application No. 2012-097133, filed Apr. 20, 2012. The contents of this application are incorporated herein by reference in their entirety.

BACKGROUND

1. Technical Field

The embodiments disclosed herein relate to a power regenerative converter and a power conversion apparatus.

2. Related Art

A power regenerative converter is conventionally known as a power regeneration apparatus. A power regenerative converter is arranged, for example, between an inverter device for controlling a motor and a three-phase AC power supply. Upon deceleration of the motor, electric power is supplied from the motor to the power regenerative converter through the inverter device. The power regenerative converter converts the power into AC power by switching elements, and supplies the AC power to the three-phase AC power supply.

Known as conduction modes of the power regenerative converter are a PWM control mode and a 120-degree conduction mode. In such conduction modes, the switching element is switched to output voltage. Hence, the output voltage contains a high-frequency component. Therefore, a filter is provided between the three-phase AC power supply and the switching elements in the power regenerative converter. The filter reduces the influence of the high-frequency component to smooth input/output currents.

Such a filter includes a reactor and a capacitor. Hence, the filter becomes a cause of the occurrence of a resonance phenomenon. With respect to this, for example, in a power regenerative converter described in JP-A-2006-340466, a damping resistor is added to an LCL filter to suppress the resonance phenomenon.

SUMMARY

A power regenerative converter according to an aspect of the embodiments includes a power conversion unit, an LCL filter, a voltage command compensation unit, and a drive control unit. The power conversion unit is configured to convert AC power supplied from an AC power supply into DC power and convert DC power into AC power to be supplied as regenerative electric power to the AC power supply. The LCL filter includes a reactor unit having a plurality of reactors connected in series between the power conversion unit and the AC power supply, and capacitors each having one end connected to a series connection point of the reactors in the reactor unit. The drive control unit controls the power conversion unit based on an AC voltage command. The voltage command compensation unit calculates a compensation value in accordance with a capacitor voltage being a voltage at the series connection point of the reactors and adds the compensation value to the AC voltage command input to the drive control unit.

DETAILED DESCRIPTION

In the following detailed description, for purpose of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

A detailed description will hereinafter be given of embodiments of a power regenerative converter and a power conversion apparatus, which are disclosed in the present application, with reference to the accompanying drawings. The present disclosure is not limited to the embodiments indicated below.

First Embodiment

Figure 1:
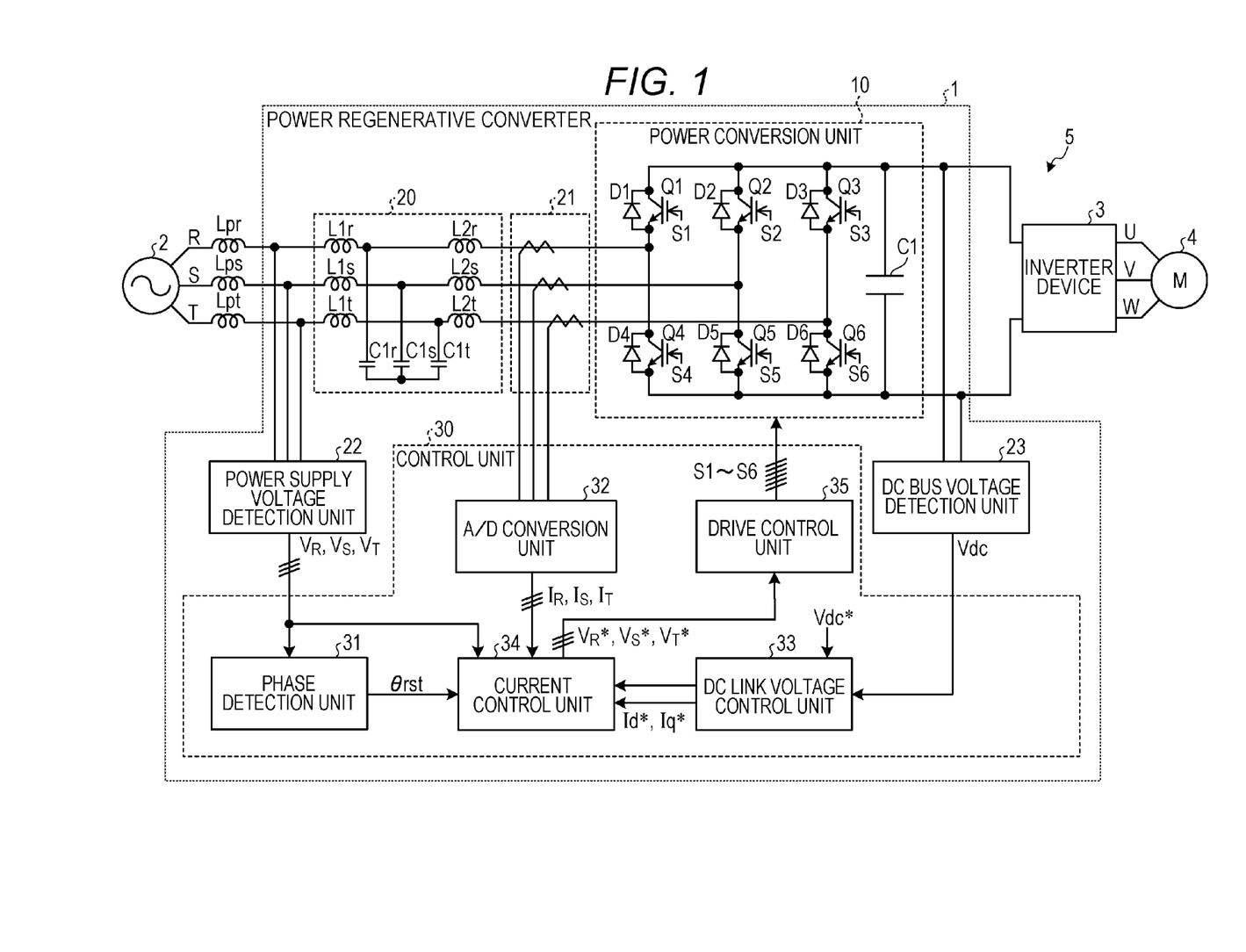
FIG. 1 is a diagram illustrating an exemplary configuration of a power regenerative converter according to a first embodiment.

FIG. 1 is a diagram illustrating an exemplary configuration of a power regenerative converter according to a first embodiment. As illustrated in FIG. 1, a power regenerative converter 1 according to the first embodiment is arranged between a three-phase AC power supply 2 and an inverter device 3. The power regenerative converter 1 converts power between the three-phase AC power supply 2 and the inverter device 3. The power regenerative converter 1 can convert AC power into DC power and convert DC power into AC power. In other words, the power regenerative converter 1 can perform bidirectional power conversion.

A power conversion apparatus 5 includes the power regenerative converter 1 and the inverter device 3. The operation state of the power conversion apparatus 5 is switched between a motoring operation state that drives a motor 4, and a regenerative operation state that generates regenerative electric power to the three-phase AC power supply 2.

Upon motoring operation, the power regenerative converter 1 functions as a converter device. The power regenerative converter 1 converts AC power supplied from the three-phase AC power supply 2 into DC power. The inverter device 3 converts the DC power converted by the power regenerative converter 1 into AC power to supply the AC power to the motor 4. Consequently, the motor 4 is driven.

On the other hand, upon regenerative operation, the inverter device 3 drives switching elements therein to convert an induced electromotive force created at the motor 4 by the deceleration of the motor 4 into DC power. The inverter device 3 supplies the DC power to the power regenerative converter 1. The power regenerative converter 1 converts the DC power supplied from the inverter device 3 into AC power, and supplies the AC power to the three-phase AC power supply 2. Consequently, power regeneration is realized.

The power regenerative converter 1 includes a power conversion unit 10, an LCL filter 20, a current detecting unit 21, a power supply voltage detecting unit 22, a DC bus voltage detecting unit 23, and a control unit 30.

The power conversion unit 10 is arranged between the three-phase AC power supply 2 and the inverter device 3. The power conversion unit 10 includes a plurality of switching elements Q1 to Q6, a plurality of diodes D1 to D6, and a smoothing capacitor C1.

The plurality of switching elements Q1 to Q6 is connected in a three-phase bridge configuration. The switching elements Q1 to Q6 are respectively connected in anti-parallel with the diodes D1 to D6. The switching elements Q1 to Q6 may be, for example, self-turn-off semiconductor elements including IGBT and MOSFET.

The LCL filter 20 is a filter having a low-pass characteristic. The LCL filter 20 smooths input/output currents flowing between the power conversion unit 10 and the three-phase AC power supply 2. The LCL filter 20 includes a plurality of reactors connected in series respectively in accordance with R-, S-, and T-phases of the three-phase AC power supply. Furthermore, the LCL filter 20 includes three capacitors respectively in accordance with the three phases of the three-phase AC power supply 2. An end of each capacitor is connected to a series connection point of the reactors of each phase. The other ends of the capacitors are connected to each other (in common).

Specifically, a plurality of reactors L1r and L2r connected in series, and a capacitor C1r are arranged between the R phase and the power conversion unit 10. An end of the capacitor C1r is connected to a series connection point of the reactors L1r and L2r. A plurality of reactors L1s and L2s connected in series, and a capacitor C1s are arranged between the S phase and the power conversion unit 10. An end of the capacitor C1s is connected to a series connection point of the reactors L1s and L2s. A plurality of reactors L1t and L2t connected in series, and a capacitor C1t are arranged between the T phase and the power conversion unit 10. An end of the capacitor C1t is connected to a series connection point of the reactors L1t and L2t. The other ends of the capacitors C1r, C1s, and C1t are connected to each other (in common). Such a connection of the capacitors is called a Y connection.

The connection configuration of the capacitors is not limited to this. For example, the capacitor C1r may be connected between the series connection point of the reactors L1r and L2r, and the series connection point of the reactors L1s and L2s. The capacitor C1s may be connected between the series connection point of the reactors L1s and L2s and the series connection point of the reactors L1t and L2t. The capacitor C1t may be connected between the series connection point of the reactors L1t and L2t and the series connection point of the reactors L1r and L2r. Such a connection of the capacitors is called a Δ connection.

The current detecting unit 21 detects a current flowing between each of the R, S, T phases of the three-phase AC power supply 2 and the power conversion unit 10. The current detecting unit 21 outputs the detection result to the control unit 30. The current detecting unit 21 may be, for example, a current sensor that detects current using a Hall element being a magneto-electric transducer.

The power supply voltage detecting unit 22 continues to repeat the detection of an instantaneous value of an AC voltage output from the three-phase AC power supply 2. Specifically, the power supply voltage detecting unit 22 monitors a connection point between each phase of the R, S and T phases of the three-phase AC power supply 2 and the LCL filter 20. The power supply voltage detecting unit 22 detects an instantaneous value of each phase voltage of the three-phase AC power supply 2 at the connection point. The power supply voltage detecting unit 22 outputs the detection results as AC voltage detection values $V_R$, $V_S$, and $V_T$. The AC voltage detection value $V_R$ is an instantaneous value of the R-phase voltage. The AC voltage detection value $V_S$ is an instantaneous value of the S-phase voltage. The AC voltage detection value $V_T$ is an instantaneous value of the T-phase voltage.

The DC bus voltage detecting unit 23 continues to repeat the detection of an instantaneous value of a DC voltage on the inverter device 3 side of the power conversion unit 10. Specifically, the DC bus voltage detecting unit 23 detects an inter-terminal voltage value of the smoothing capacitor C1, and outputs the inter-terminal voltage value as a DC voltage value Vdc to the control unit 30.

The control unit 30 controls the power conversion unit 10. The control unit 30 includes a phase detecting unit 31, an A/D converter 32, a DC link voltage control unit 33, a current control unit 34, and a drive control unit 35.

The phase detecting unit 31 detects a voltage phase of the three-phase AC power supply 2 based on the AC voltage detection values $V_R$, $V_S$, and $V_T$ output from the power supply voltage detecting unit 22, and outputs the voltage phase as a voltage phase detection value θrst. The voltage phase detection value θrst is output to the current control unit 34. The voltage phase detection value θrst is used for current control in the current control unit 34. A technique for calculating the phases of the three-phase AC power supply 2 from the AC voltage detection values $V_R$, $V_S$, and $V_T$ is publicly known, and the phase detecting unit 31 includes, for example, a PLL (Phase Locked Loop).

The A/D converter 32 performs A/D conversion on the R-, S-, and T-phase currents detected by the current detecting unit 21 to convert them into phase current detection values $I_R$, $I_S$, and $I_T$ being digital values. The phase current detection value $I_R$ is an instantaneous value of the R-phase current. The phase current detection value $I_S$ is an instantaneous value of the S-phase current. The phase current detection value $I_T$ is an instantaneous value of the T-phase current.

The DC link voltage control unit 33 outputs a current command so as to maintain the inter-terminal voltage of the smoothing capacitor C1 constant, based on a DC voltage command Vdc* accepted from an unillustrated upper controller. The DC link voltage control unit 33 is a voltage regulator (Automatic Voltage Regulator: AVR). The DC link voltage control unit 33 compares the DC voltage value Vdc and the DC voltage command Vdc*, and generates a d-axis current command Id* and a q-axis current command Iq*, for example, by performing PI control. The q-axis current command Iq* is a target current value of an active current. The d-axis current command Id* is a target current value of a reactive current. If the power factor is set to 1, the d-axis current command Id* is set to zero.

The current control unit 34 generates voltage commands $V_R^*$, $V_S^*$, and $V_T^*$ by control computation such that a d-axis current and a q-axis current in accordance with the d-axis current command Id* and the q-axis current command Iq*, which are output from the DC link voltage control unit 33, flow.

The drive control unit 35 generates PWM signals S1 to S6 that drive the switching elements Q1 to Q6, respectively, based on the voltage commands $V_R^*$, $V_S^*$, and $V_T^*$ output from the current control unit 34. The PWM signals S1 to S6 are on commands that turn on the switching elements Q1 to Q6 when at a high level.

A terminal voltage Vc of the capacitors C1r, C1s, and C1t constituting the LCL filter 20 is a voltage of the series connection point of the reactors. Hence, the terminal voltage may be described below as the capacitor voltage Vc. The current control unit 34 according to the first embodiment calculates a compensation value in accordance with the capacitor voltage Vc, and adds the compensation value to the voltage command. Consequently, it is possible to suppress oscillations of current and/or voltage, which arise from the resonance of the LCL filter 20. Furthermore, it is also possible to suppress oscillations of current and/or voltage, which arise from the line inductance (power supply impedance) accompanied by long-distance wiring. A specific description will hereinafter be given of the current control unit 34.

Figure 2:
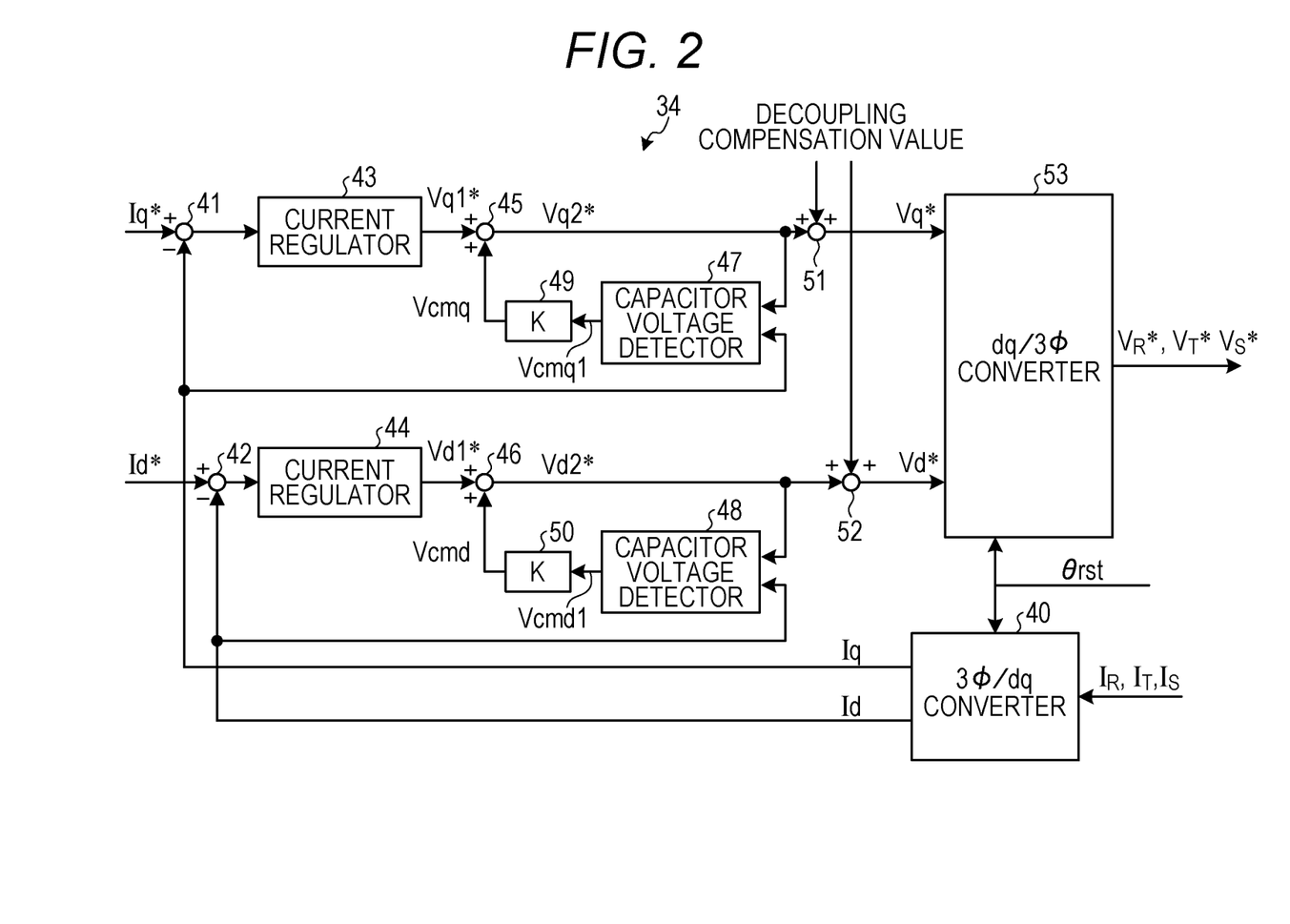
FIG. 2 is a diagram illustrating an exemplary configuration of a control unit of the power regenerative converter according to the first embodiment.

FIG. 2 is a diagram illustrating an exemplary configuration of the current control unit 34 according to the first embodiment. As illustrated in FIG. 2, the current control unit 34 includes a 3φ/dq converter 40, subtractors 41 and 42, current regulators 43 and 44, adders 45, 46, 51 and 52, capacitor voltage detectors 47 and 48, multipliers 49 and 50, and a dq/3φ converter 53. An example of a voltage command compensation unit includes the adders 45 and 46, the capacitor voltage detectors 47 and 48, and the multipliers 49 and 50.

The 3φ/dq converter 40 calculates a q-axis current value Iq and a d-axis current value Id from the phase current detection values $I_R$, $I_S$, and $I_T$. Specifically, the 3φ/dq converter 40 converts the phase current detection values $I_R$, $I_S$, and $I_T$ into components (α and β components) of two axes that are orthogonal on a fixed coordinate. The 3φ/dq converter 40 then converts the components (α and β components) of an αβ axis coordinate system into a q-axis component and a d-axis component of a rotating coordinate system including the d and q axes, based on the voltage phase detection value θrst detected by the phase detecting unit 31.

The subtractor 41 calculates a q-axis current deviation being a deviation between the q-axis current command Iq* and the q-axis current value Iq, and outputs it to the current regulator (Automatic Current Regulator: ACR) 43. The current regulator 43 performs, for example, PI control on the q-axis current deviation. Consequently, the current regulator 43 generates a q-axis voltage command Vq1* that makes the q-axis current deviation zero, and outputs the q-axis voltage command Vq1* to the adder 45.

The adder 45 adds a q-axis compensation value Vcmq output from the multiplier 49 to the q-axis voltage command Vq1* to generate a q-axis voltage command Vq2*. The adder 45 outputs the q-axis voltage command Vq2* to the adder 51. The adder 51 adds the q-axis voltage command Vq2* and a decoupling compensation value generated by an unillustrated decoupling controller. The adder 51 outputs the addition result as a q-axis voltage command Vq* to the dq/3φ converter 53.

The adder 51 may add the RMS voltage of the three-phase AC power supply 2 to the q-axis voltage command Vq2*. Consequently, it is also possible to perform EMF compensation control. Moreover, the adder 51 may add ω(L+Lg)Id to the q-axis voltage command Vq2* as well as the adder 52 may add −ω(L+Lg)Iq to the q-axis voltage command Vq2*. Consequently, it is also possible to perform decoupling compensation. If the decoupling compensation and the EMF compensation are not performed, the current control unit 34 may not include the adders 51 and 52.

The capacitor voltage detector 47 generates a compensation value Vcmq1 in accordance with the q-axis component of the capacitor voltage Vc, based on the q-axis voltage command Vq2* and the q-axis current value Iq (the q-axis current command Iq* can also be substituted). The multiplier 49 multiplies the compensation value Vcmq1 by a gain coefficient K to generate a q-axis compensation value Vcmq.

The subtractor 42 calculates a d-axis current deviation being the deviation between the d-axis current command Id* and the d-axis current value Id to output it to the current regulator 44. The current regulator 44, for example, performs PI control on the d-axis current deviation. Consequently, the subtractor 42 generates a d-axis voltage command Vd1* so as to make the d-axis current deviation zero to output it to the adder 46.

The adder 46 adds a d-axis compensation value Vcmd output from the multiplier 50 to the d-axis voltage command Vd1* to generate a d-axis voltage command Vd2*. The adder 46 outputs the d-axis voltage command Vd2* to the adder 52. The adder 52 adds the d-axis voltage command Vd2* and a decoupling compensation value generated by an unillustrated decoupling controller. The adder 52 outputs the addition result as a d-axis voltage command Vd* to the dq/3φ converter 53.

The capacitor voltage detector 48 generates a compensation value Vcmd1 in accordance with the q-axis of the capacitor voltage Vc, based on the d-axis voltage command Vd2* and the d-axis current value Id (the d-axis current command Id* can also be substituted). The multiplier 50 multiplies the compensation value Vcmd1 by the gain coefficient K to generate the d-axis compensation value Vcmd.

The dq/3φ converter 53 generates voltage commands $V_R^*$, $V_S^*$, and $V_T^*$ based on the q-axis voltage command Vq* and the d-axis voltage command Vd* to output them to the drive control unit 35. Specifically, the dq/3φ converter 53 calculates a voltage command V* and a phase command θa*, for example, based on the following equations (1) and (2).

$$\text{Voltage command } V^* = (Vd^{*2} + Vq^{*2})^{1/2} \tag{1}$$

$$\text{Phase command } \theta a^* = \tan^{-1}(Vq^*/Vd^*) \tag{2}$$

The dq/3φ converter 53 adds the voltage phase detection value θrst to the phase command θa* to calculate a phase θp. The dq/3φ converter 53 then obtains the voltage commands $V_R^*$, $V_S^*$, and $V_T^*$ based on the voltage command V* and the phase θp. For example, the dq/3φ converter 53 obtains the R-phase voltage command $V_R^*$, the S-phase voltage command $V_S^*$, and the T-phase voltage command $V_T^*$ from the following equations (3) to (5).

$$V_R^* = V^* \times \sin(\theta p) \tag{3}$$

$$V_S^* = V^* \times \sin(\theta p - (2\pi/3)) \tag{4}$$

$$V_T^* = V^* \times \sin(\theta p + (2\pi/3)) \tag{5}$$

In this manner, the control unit 30 according to the embodiment adds, to a q-axis voltage command Vq1**, the q-axis compensation value Vcmq in accordance with the terminal voltage Vc of the capacitor included in the LCL filter 20. Furthermore, the control unit 30 adds, to the d-axis voltage command Vd1*, the d-axis compensation value Vcmd in accordance with the terminal voltage Vc of the capacitor included in the LCL filter 20. Consequently, it becomes possible to suppress oscillations of current and/or voltage on the three-phase AC power supply 2 side, which arise from the resonance of the LCL filter 20 and the power supply impedance.

Figure 3:
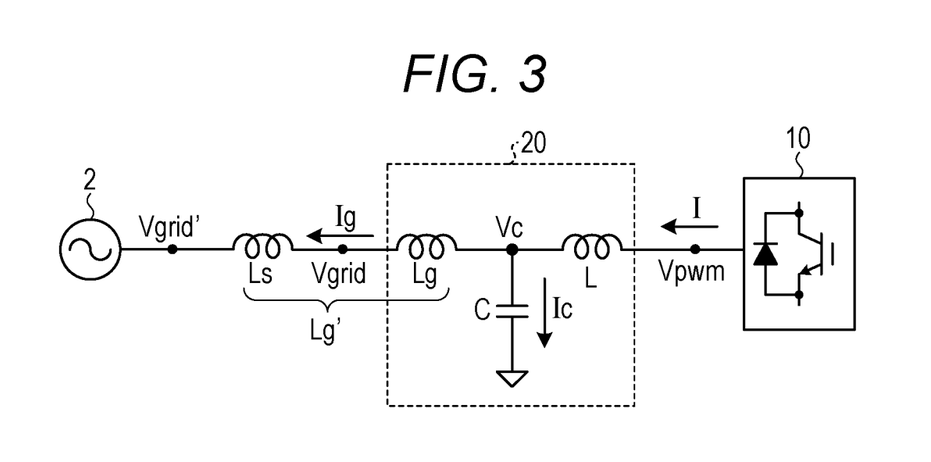
FIG. 3 is a diagram illustrating a relationship between current and voltage between a three-phase AC power supply and a power conversion unit.

Here, a description will be given of the detection of the capacitor voltage Vc. FIG. 3 is a diagram illustrating a relationship between current and voltage between the three-phase AC power supply 2 and the power conversion unit 10. In FIG. 3, "Lg" represents the inductance of the reactors L1r, L1s, and L1t. "L" represents the inductance of the reactors L2r, L2s, and L2t. "C" represents the capacitance of the capacitors C1r, C1s, and C1t. Furthermore, "Ls" represents inductance Lpr, Lps, Lpt (see FIG. 1) of a line connecting the three-phase AC power supply 2 and the LCL filter 20.

"I" represents a current flowing between the power conversion unit 10 and the LCL filter 20. "Ig" represents a current flowing between the LCL filter 20 and the three-phase AC power supply 2. "Vgrid" represents a voltage of the connection point of the three-phase AC power supply 2 and the LCL filter 20. "Vpwm" represents an AC voltage command of the power conversion unit 10. Furthermore, "Vgrid'" represents a voltage of the three-phase AC power supply 2.

Figure 4:
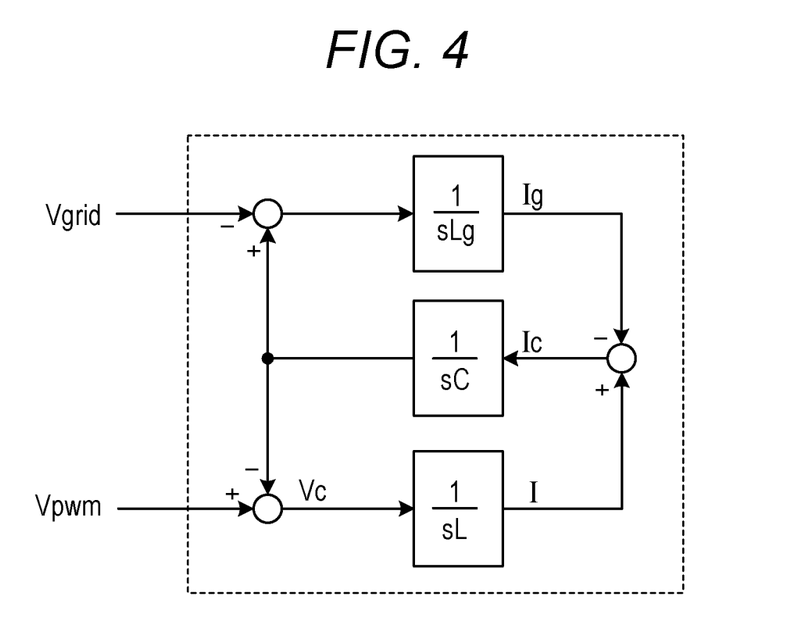
FIG. 4 is a block diagram of an LCL filter model of when a voltage command is not corrected.

If the control unit 30 does not correct a voltage command by a compensation value, the model of the LCL filter 20 illustrated in FIG. 3 can be expressed as in the following equation (7). The following equation (7) corresponds to the block diagram illustrated in FIG. 4. FIG. 4 is a block diagram of the LCL filter model illustrated in FIG. 3.

$$\begin{cases} L\dfrac{dI}{dt} = V_{pwm} - V_c \\ I_c = I - I_g \\ \dfrac{1}{C}\int I_c dt = V_c \\ L_g\dfrac{d}{dt}I_g = V_c - V_{grid} \end{cases} \quad (7)$$

A circuit where three capacitors of the capacitance C are Δ-connected is equivalent to a circuit where three capacitors of the capacitance C/3 are Y-connected. Therefore, if the capacitors C1r, C1s, and C1t are Δ-connected, a value corresponding to one-third of the capacitance of the capacitors C1r, C1s, and C1t is substituted into the capacitance C described in the equation (7).

If a resistance value $R_n$ of internal resistance of the reactors L2r, L2s, and L2t in the LCL filter 20 is not ignored, the above equation (7) can be expressed as in the following equation (8).

$$L\dfrac{dI}{dt} + R_n I = V_{pwm} - V_c \quad (8)$$

From the above equation (8), the capacitor voltage Vc can be expressed as in the following equation (9).

$$V_c = V_{pwm} - L\dfrac{dI}{dt} - R_n I \quad (9)$$

If the capacitor voltage detectors 47 and 48 are estimators, the above equation (9) is Laplace transformed to derive the following equation (10). The capacitor voltage detectors 47 and 48 include a low-pass filter. $\omega_n$ is a cutoff frequency of the low-pass filters of the capacitor voltage detectors 47 and 48.

$$\hat{V}_c = \dfrac{\omega_n}{s + \omega_n}(V_{pwm} - R_n I - LsI) \quad (10)$$

$$= \dfrac{\omega_n}{s + \omega_n}(V_{pwm} - R_n I + \omega_n LI) - \omega_n LI$$

Figure 5:
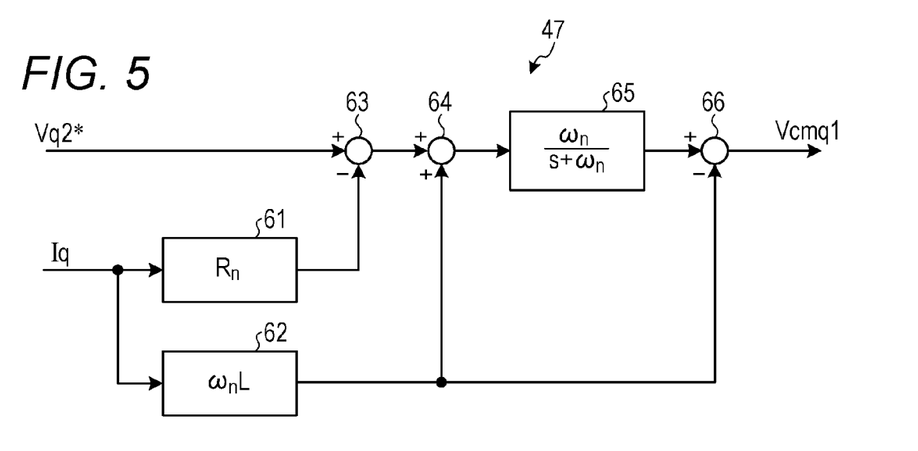
FIG. 5 is a diagram illustrating an exemplary configuration of a capacitor voltage detector according to the first embodiment.

Here, a description will be given of the configurations of the capacitor voltage detectors 47 and 48. The capacitor voltage detectors 47 and 48 have a similar configuration. Hence, a description will be given below of the configuration of the capacitor voltage detector 47. FIG. 5 is a diagram illustrating an exemplary configuration of the capacitor voltage detector 47.

As illustrated in FIG. 5, the capacitor voltage detector 47 includes multipliers 61, 62, and 65, subtractors 63 and 66, and an adder 64.

The multiplier 61 multiplies the q-axis current value Iq by the internal resistance value $R_n$ of the reactors L2r, L2s, and L2t, and output a multiplication result $IqR_n$. The multiplier 62 multiplies the q-axis current value Iq by $\omega_n L$, and outputs a multiplication result $Iq\omega_n L$.

The subtractor 63 subtracts the multiplication result $IqR_n$ of the multiplier 61 from the q-axis voltage command Vq2*. The adder 64 adds the multiplication result $Iq\omega_n L$ of the multiplier 62 to the subtraction result of the subtractor 63. The multiplier 65 multiplies the addition result of the adder 64 by $\omega_n/(s+\omega_n)$. The subtractor 66 subtracts the multiplication result of the multiplier 62 from the multiplication result of the multiplier 65.

The subtraction result of the subtractor 66 is the output (the compensation value Vcmq1) of the capacitor voltage detector 47. The compensation value Vcmq1 can be expressed as in the following equation (11). The equation (11) is an equation corresponding to the above equation (10). The compensation value Vcmq1 is a compensation value that compensates the q-axis voltage command Vq1* being a voltage command of the q-axis component. The compensation value Vcmq1 is an estimated value of a value obtained by performing a filtering process on a capacitor voltage Vcq of the q-axis component with the low-pass filter of the cutoff frequency $\omega_n$.

$$Vcmp1 = \dfrac{\omega_n}{s + \omega_n}(Vq2* - R_n Iq + \omega_n LIq) - \omega_n LIq \quad (11)$$

In this manner, the control unit 30 according to the embodiment calculates a compensation value in accordance with the capacitor voltage Vc to add the compensation value to a voltage command. Consequently, it is possible to suppress oscillations of current and/or voltage, which arise from the resonance of the LCL filter 20, and the power supply impedance.

The oscillations of current and/or voltage on the three-phase AC power supply 2 side include an oscillation arising from the resonance of the LCL filter 20 (an oscillation arising from resonance), and an oscillation arising from line inductance, which is caused when a wiring distance between the three-phase AC power supply 2 and the LCL filter 20 is long (an oscillation arising from line inductance). In the power regenerative converter 1 according to the embodiment, it is possible to suppress both of the oscillation arising from resonance and the oscillation arising from line inductance.

First, a description will be given of a principle where the oscillation arising from resonance is suppressed. If the control unit 30 does not correct a voltage command by a compensation value, the model of the LCL filter 20 can be expressed as in the equation (7) as described above.

The voltage Vgrid at the connection point of the three-phase AC power supply 2 and the LCL filter 20 hardly oscillates if the line inductance on the three-phase AC power supply 2 side (hereinafter described as the power supply impedance) is small. Hence, Vgird=0 (if only a variation component is extracted and it is expressed by the above equation (7)). On this condition, if the above equation (7) is Laplace transformed, the LCL filter model can be expressed as indicated in the following equation (12).

$$\begin{cases} LsI = V_{pwn} - V_c \\ I_c = I - I_g \\ \dfrac{1}{sC} I_c = V_c \\ L_g s I_g = V_c \end{cases} \quad (12)$$

Furthermore, the above equation (12) can be expressed as in the following equation (13) if Vc, I, and Ic are deleted.

$$\{(CLL_g)s^3 + (L + L_g)s\} I_g = V_{pwn} \quad (13)$$

A transfer function Gs1(s) from the AC voltage command Vpwm of the power conversion unit 10 to the current Ig of the three-phase AC power supply 2 (hereinafter described as the system current Ig) can be expressed as in the following equation (14).

$$Gs1(s) = \dfrac{I_g}{V_{pwn}} \quad (14)$$

$$= \dfrac{1}{s\{CLL_g s^2 + (L + L_g)\}}$$

The quadratic coefficient of the above transfer function Gs1(s) is zero. Hence, the transfer function Gs1(s) is a system that cannot be attenuated, in other words, a system that cannot stop an oscillation. Hence, the oscillation arising from the resonance of the LCL filter 20 is considered to occur.

Figure 6:
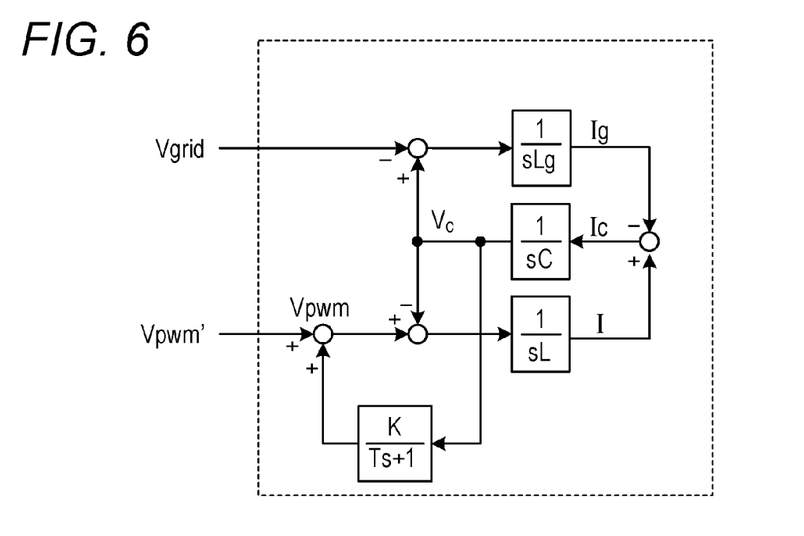
FIG. 6 is a block diagram of an LCL filter model of when a voltage command is not corrected.

On the other hand, a case where the AC voltage command Vpwm is corrected is considered. In this case, the capacitor voltage Vc is estimated. A value obtained by multiplying the capacitor voltage Vc by K/(Ts+1) is added to an AC voltage command (Vpwm' in FIG. 6). In this case, the model of the LCL filter 20 can be expressed as in the block diagram illustrated in FIG. 6, and can be expressed as in the following equation (15).

$$\begin{cases} LsI = V_{pwn} - V_c \\ I_c = I - I_g \\ \dfrac{1}{sC} I_c = V_c \\ L_g s I_g = V_c \\ V_{pwn} = \dfrac{K}{Ts+1} V_c + V'_{pwn} \end{cases} \quad (15)$$

From the above equation (15), the following equations (16) and (17) are obtained.

$$V_{pwn} = \dfrac{K}{Ts+1}(L_g s I_g) + V'_{pwn} \quad (16)$$

$$\{(CLL_g)s^3 + (L + L_g)s\} I_g = V_{pwn} \quad (17)$$

Form the above equations (16) and (17), the AC voltage command Vpwm after the addition correction is deleted. Consequently, the following equation (18) is obtained.

$$\{(CLL_g)s^3 + (L + L_g)s\} I_g = \dfrac{K}{Ts+1}(L_g s I_g) + V'_{pwn} \quad (18)$$

Therefore, a transfer function Gs2(s) from the AC voltage command Vpwm' to the system current Ig can be expressed as in the following equation (19).

$$Gs2(s) = \dfrac{I_g}{V'_{pwn}} \quad (19)$$

$$= \dfrac{Ts + 1}{s\{TCLL_g s^3 + CLL_g s^2 + (LT + L_g T)s + (L + L_g - KL_g)\}}$$

In the transfer function Gs2(s), there exist the coefficients of all the degrees (s). Therefore, the transfer function Gs2(s) is a system that can be attenuated, in other words, a system that can stop an oscillation. The degree of the attenuation can be adjusted by the coefficients T and K. Consequently, the oscillation arising from resonance can be suppressed. As indicated in the above equation (19), a damping effect can be obtained by (LT+LgT)s.

If oscillations of voltage and/or current on the three-phase AC power supply 2 side, which arise from resonance, are suppressed, it is considered to detect the voltage Vgrid on the three-phase AC power supply 2 side, and perform feedback control on the voltage Vgrid. However, if the power supply impedance is small, a resonance component is unlikely to appear in the voltage Vgrid on the three-phase AC power supply 2 side. Hence, such resonance suppression is not easy. On the other hand, the capacitor voltage Vc to be estimated or directly detected does not depend on the state on the three-phase AC power supply 2 side (e.g., the magnitude of the power supply impedance), compared with the voltage Vgrid. Hence, it is possible to easily suppress the oscillation arising from resonance by using the capacitor voltage Vc.

Figure 7:
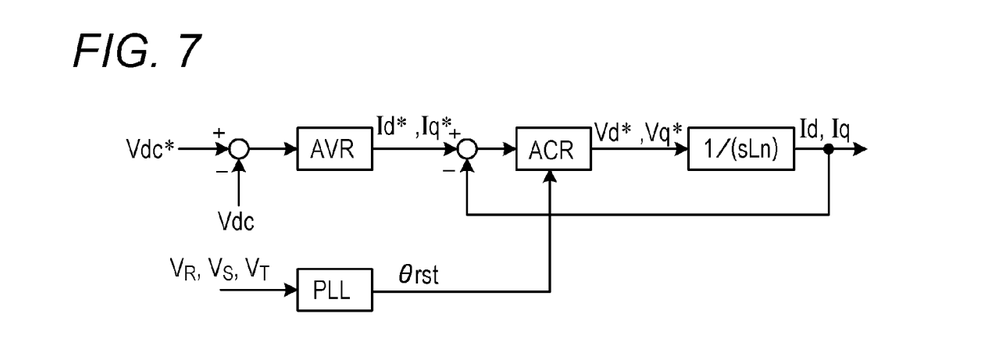
FIG. 7 is a diagram illustrating the control configuration of the power regenerative converter of when a voltage command is not corrected.

Next, a description will be given of a principle where the oscillation arising from the power supply impedance (line inductance) is suppressed. If the control unit 30 does not correct a voltage command by a compensation value in accordance with the capacitor voltage Vc, the control configuration of the power regenerative converter 1 is illustrated as in FIG. 7. FIG. 7 is a diagram of the control configuration of the power regenerative converter 1 of when a voltage command is not corrected.

As illustrated in FIG. 7, the power regenerative converter 1 includes the voltage regulator (AVR), the current regulator (ACR), and the phase detector (PLL). The voltage regulator (AVR) controls a DC link voltage (DC bus voltage). The current regulator (ACR) controls input/output currents (alternating currents) of the power regenerative converter 1. The phase detector (PLL) detects the phase of an AC voltage supplied from the three-phase AC power supply 2. In such a configuration, an oscillation caused by control interference, which arise from the power supply impedance, can be suppressed by suppressing interference in the response bandwidth of each controller.

For example, assume that the current regulator is designed to obtain an arbitrary frequency response ωs. In this case, it is designed such that the response of the voltage regulator is one-fifth of ωs, and the response of the phase detector is five times ωs. Consequently, it is possible to avoid that their response bandwidths interfere.

A circuit model to be a target of current control can be expressed as in the above-mentioned FIG. 3. If only a basic wave component is considered as a target of current control, a harmonic component included in Ic can be ignored. This is because the oscillation caused due to the power supply impedance is a low frequency. Furthermore, since a basic wave component of Ic is also small, it is possible to regard I=Igrid. In this case, a model equation of current control can be expressed as in the following equation (20). Lg' represents inductance where Ls and Lg are added. Moreover, R represents the internal resistance of the reactor L (L2r, L2s, and L2t illustrated in FIG. 1). $R_0$ represents resistance existing between the three-phase AC power supply 2 (Vgrid') and the capacitor terminal (Vc).

$$(L'_g + L)\frac{dI}{dt} = -(R + R_0)I + V_{pwm} - V'_{grid} \quad (20)$$

Assume that the power supply impedance is known. In this case, the following process may be performed in PI control in the current regulator, based on inductance (Lg'+L) and internal resistance (R+$R_0$), in order to set a response frequency to ωs. Kp represents a proportional gain of PI control. Ti represents the integral time of PI control.

$$G_{pl}(s) = K_p\left(1 + + \frac{1}{T_i s}\right) \quad (21)$$

$$K_p = (L'_g + L)\omega_s \quad (22)$$

$$T_i = (L'_g + L)/(R + R_0) \quad (23)$$

However, it is assumed that the power regenerative converter 1 is normally installed in various places. Hence, the power supply impedance connected to the power regenerative converter 1 is not constant but unknown. Hence, a method where L is set to be a reference, in other words, a method where Kp=Lωs and Ti=L/R is used. However, in this method, the gain Kp is decreased by Lg' compared with the above equation (22). Hence, a response becomes slower. Hence, the inductance Lg' (especially, the unexpected power supply impedance Ls) reduces the responsiveness of the current control system. Hence, The inductance Lg' becomes a factor to cause control interference with the voltage regulator.

On the other hand, a case where the AC voltage command Vpwm is corrected is considered. In this case, the capacitor voltage Vc is estimated. The capacitor voltage Vc is added to the AC voltage command. The capacitor voltage Vc corresponds to a voltage variation due to the power supply voltage Vgrid' of the three-phase AC power supply 2 and the inductance Lg' on the three-phase AC power supply 2 side. The capacitor voltage Vc can be expressed as in the following equation (24).

$$\hat{V}_c \approx R_0 I + V'_{grid} + L'_g \frac{dI}{dt} \quad (24)$$

When such a capacitor voltage Vc is added to the AC voltage command Vpwm, the model equation of current control, which is indicated in the above equation (20), can obtain the following equation (25).

$$(L'_g + L)\frac{dI}{dt} = -(R + R_0)I + (V_{pwm} + \hat{V}_c) - V'_{grid} \quad (25)$$

From the above equation (24), the above equation (25) can be expressed as in the following equation (26).

$$(L'_g + L)\frac{dI}{dt} = -(R + R_0)I + \left(V_{pwm} + R_0 I + V'_{grid} + L'_g \frac{dI}{dt}\right) - V'_{grid} \quad (26)$$

If the above equation (26) is reorganized, the following equation (27) can be obtained.

$$L\frac{dI}{dt} = -RI + V_{pwm} \quad (27)$$

The above equation (27) does not include the power supply voltage Vgrid' and the inductance Ls on the three-phase AC power supply 2 side. Hence, in the design of current control, it may be set to Kp=Lωs and Ti=L/R. Consequently, a current response can be set as the design value ωs regardless of the presence or absence of the power supply impedance.

As described above, the power regenerative converter 1 according to the embodiment adds a compensation value in accordance with the capacitor voltage Vc to the AC voltage command Vpwm (the voltage commands Vq1* and Vd1*). Consequently, a current response can be set to the arbitrary design value ωs. As a result, it is possible to prevent the deterioration of a response in the current control system and an oscillation due to control interference. A compensation value in accordance with the capacitor voltage Vc may be added, for example, to the voltage commands Vq* and Vd* or the voltage commands $V_R^*$, $V_S^*$, and $V_T^*$, instead of to the voltage commands Vq1* and Vd1*.

Second Embodiment

Figure 8:
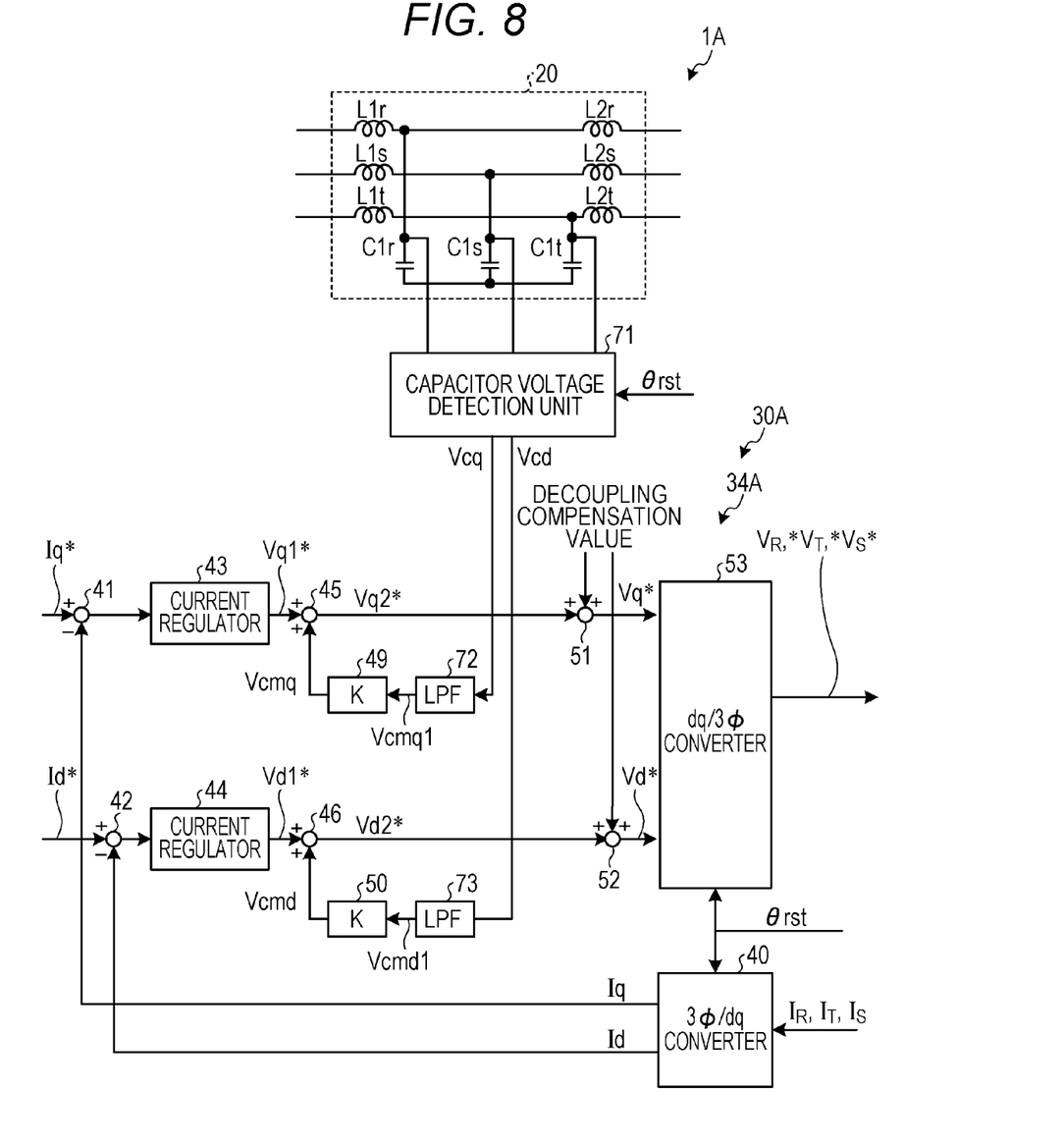
FIG. 8 is a diagram illustrating an exemplary configuration of a power regenerative converter according to a second embodiment.

Next, a description will be given of a power regenerative converter according to a second embodiment. In the power regenerative converter 1 according to the first embodiment, the capacitor voltage Vc is estimated. On the other hand, a power regenerative converter 1A according to the second embodiment includes a capacitor voltage detecting unit 71 that detects the capacitor voltage Vc. In the second embodiment, the same reference numerals are assigned to components having the same functions as the components indicated in the first embodiment. Their descriptions will be omitted. Moreover, for convenience of description, a part of the configuration is not illustrated.

FIG. 8 is a diagram illustrating an exemplary configuration of the power regenerative converter 1A according to the second embodiment. As illustrated in FIG. 8, the power regenerative converter 1A includes the capacitor voltage detecting unit 71 and a control unit 30A.

The capacitor voltage detecting unit 71 detects terminal voltages Vcr, Vcs and Vct of the capacitors C1r, C1s, and C1t. The capacitor voltage detecting unit 71 converts the detection results into components (α and β components) of two axes that are orthogonal on a fixed coordinate system. Furthermore, the capacitor voltage detecting unit 71 converts the α and β components into a q-axis component and a d-axis component of a rotating coordinate system including the d and q axes based on the voltage phase detection value θrst.

The q-axis component is the q-axis capacitor voltage detection value Vcq, and the d-axis component is a d-axis capacitor voltage detection value Vcd.

The capacitor voltage detecting unit 71 outputs the q-axis capacitor voltage detection value Vcq, and the d-axis capacitor voltage detection value Vcd to a current control unit 34A of the control unit 30A. The current control unit 34A includes a low-pass filters (LPFs) 72 and 73 instead of the capacitor voltage detectors 47 and 48.

The LPF 72 filters the q-axis capacitor voltage detection value Vcq with the cutoff frequency $\omega_n$ to generate the compensation value Vcmq1. The LPF 73 filters the d-axis capacitor voltage detection value Vcd with the cutoff frequency $\omega_n$ to generate the compensation value Vcmd1. The multiplier 49 multiplies the compensation value Vcmq1 by the gain coefficient K to generate the q-axis compensation value Vcmq. The multiplier 50 multiplies the compensation value Vcmd1 by the gain coefficient K to generate the d-axis compensation value Vcmd. The other processes are similar to those in the control unit 30 according to the first embodiment.

In this manner, in the power regenerative converter 1A, the detected capacitor voltage Vc (Vcr, Vcs, and Vct) is filtered with the cutoff frequency $\omega_n$, and is subsequently multiplied by the gain coefficient K. Consequently, the compensation values Vcmq and Vcmd are obtained. The compensation values Vcmq and Vcmd are added to the voltage commands Vq1* and Vd1*. Consequently, the power regenerative converter 1A can set a current response to the arbitrary design value $\omega$s similarly to the power regenerative converter 1. As a result, it is possible to prevent the deterioration of a response of the current control system and an oscillation due to control interference. An example of the voltage command compensation unit includes the LPFs 72 and 73, and the multipliers 49 and 50.

Furthermore, the power regenerative converters 1 and 1A can adjust an attenuation coefficient by adjusting the proportional gain of PI control in the current regulators 43 and 44. Consequently, an attenuation coefficient can be corrected more appropriately.

Moreover, the power regenerative converters 1 and 1A can perform also the decoupling compensation and the EMF compensation.

A method for obtaining the capacitor voltage Vc includes, for example, the following method. In other words, the voltage (Vgrid described in FIG. 3) at the connection point of the three-phase AC power supply 2 and the LCL filter 20 is detected first by the power supply voltage detecting unit 22 described in FIG. 2. The multiplication value of the inductance Lg and the system current Ig is added to the voltage. In this case, it is preferable that the power regenerative converters 1 and 1A include a current detector for detecting the system current Ig.

A further effect and a further modification can be readily derived by those skilled in the art. Hence, a wider range of aspects of the present disclosure is not limited to the specific details and the representative embodiments, which have been expressed and described as in above. Therefore, various alterations can be made without departing from a spirit or scope of the overall concept, which is defined by the accompanying claims and their equivalents.

Moreover, the power regenerative converter of the present disclosure may be the following first to fourth power regenerative converters. The first power regenerative converter includes: a power conversion unit for regenerating power to a three-phase AC power supply by converting AC power supplied from the three-phase AC power supply into DC power and converting DC power into AC power; an LCL filter including a plurality of reactors respectively connected in series between the power conversion unit and the phases of the three-phase AC power supply, and capacitors each having one end connected to a series connection point of the reactors, where the other ends of the capacitors of the phases are connected in common; a voltage command generation unit for generating a voltage command; a voltage command compensation unit for computing a compensation value in accordance with a voltage at the series connection point of the reactors and adding the compensation value to the voltage command; and a drive control unit for controlling the power conversion unit based on an AC voltage command to which the compensation value is added by the voltage command compensation unit.

The second power regenerative converter includes: a power conversion unit for regenerating power to a three-phase AC power supply by converting AC power supplied from the three-phase AC power supply into DC power and converting DC power into AC power; an LCL filter including a plurality of reactors respectively connected in series between the power conversion unit and the phases of the three-phase AC power supply, and capacitors each having both ends connected between series connection points of the reactors of the phases; a voltage command generation unit for generating a voltage command; a voltage command compensation unit for computing a compensation value in accordance with a voltage at the series connection point of the reactors and adding the compensation value to the voltage command; and a drive control unit for controlling the power conversion unit based on an AC voltage command to which the compensation value is added by the voltage command compensation unit.

The third power regenerative converter in the first or second power regenerative converter includes a current detecting unit for detecting a current flowing between the power conversion unit and the three-phase AC power supply, wherein the voltage command compensation unit estimates the voltage at the series connection point of the reactors based on the current detected by the current detecting unit and the AC voltage command, and computes a compensation value in accordance with the estimated value.

The fourth power regenerative converter in the first or second power regenerative converter includes a voltage detecting unit for detecting the voltage at the series connection point of the reactors, wherein the voltage command compensation unit computes a compensation value in accordance with the voltage at the series connection point of the reactors, the voltage being detected by the voltage detecting unit. Moreover, the power conversion apparatus of the present disclosure may be the following first or second power conversion apparatus. The first power conversion apparatus includes a power regenerative converter connected to a three-phase AC power supply, and an inverter connected to the power regenerative converter, wherein the power regenerative converter has: a power conversion unit for regenerating power to a three-phase AC power supply by converting AC power supplied from the three-phase AC power supply into DC power and converting DC power into AC power; an LCL filter including a plurality of reactors respectively connected in series between the power conversion unit and the phases of the three-phase AC power supply, and capacitors each having one end connected to a series connection point of the reactors, where the other ends of the capacitors of the phases are connected in common; a voltage command generation unit for generating a voltage command; a voltage command compensation unit for computing a compensation value in accordance with a voltage at the series connection point of the reactors and adding the compensation value to the voltage command; and a drive control unit for controlling the power conversion unit based on an AC voltage command to which the compensation value is added by the voltage command compensation unit.

The second power conversion apparatus includes a power regenerative converter connected to a three-phase AC power supply, and an inverter connected to the power regenerative converter, wherein the power regenerative converter has: a power conversion unit for regenerating power to a three-phase AC power supply by converting AC power supplied from the three-phase AC power supply into DC power and converting DC power into AC power; an LCL filter including a plurality of reactors respectively connected in series between the power conversion unit and the phases of the three-phase AC power supply, and capacitors each having both ends connected between series connection points of the reactors of the phases; a voltage command generation unit for generating a voltage command; a voltage command compensation unit for computing a compensation value in accordance with a voltage at the series connection point of the reactors and adding the compensation value to the voltage command; and a drive control unit for controlling the power conversion unit based on an AC voltage command to which the compensation value is added by the voltage command compensation unit.

The foregoing detailed description has been presented for the purposes of illustration and description. Many modifications and variations are possible in light of the above teaching. It is not intended to be exhaustive or to limit the subject matter described herein to the precise form disclosed. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims appended hereto.

What is claimed is:

1. A power regenerative converter comprising:
   a power conversion unit configured to convert AC power supplied from an AC power supply into DC power and convert DC power into AC power to be supplied as regenerative electric power to the AC power supply;
   an LCL filter including a reactor unit having a plurality of reactors connected in series between the power conversion unit and the AC power supply, and capacitors each having one end connected to a series connection point of the reactors in the reactor unit;
   a drive control unit for controlling the power conversion unit based on a first voltage command, the drive control unit being electrically connected to the power conversion unit; and a voltage command compensation unit configured to calculate a compensation value by obtaining a first value by performing a filtering process with a low pass filter on an estimated capacitor voltage, the capacitor voltage being a voltage at the series connection point of the reactors, and multiplying the first value by a coefficient to calculate the compensation value, the voltage command compensation unit including an adder to add the compensation value to a second voltage command based on a target current; and a current detecting unit for detecting a current flowing between the power conversion unit and the AC power supply, the AC power supply being a three-phase AC power supply, wherein the voltage command compensation unit is configured to estimate the capacitor voltage based in part on the current detected by the current detecting unit, and the voltage command compensation unit calculates the compensation value in accordance with the estimated capacitor voltage, and wherein the first voltage command is output to the drive control unit.

2. The power regenerative converter according to claim 1, wherein the reactor unit and the capacitor are provided for each phase of the AC power supply.

3. The power regenerative converter according to claim 2, wherein the other ends of the capacitors of the phases are connected to each other.

4. The power regenerative converter according to claim 2, wherein the other end of the capacitor of each phase is connected to the series connection point of the reactors in the reactor unit in another phase.

5. A power conversion apparatus comprising:
   the power regenerative converter according to claim 1; and
   an inverter connected to the power regenerative converter.

6. The power regenerative converter according to claim 1, wherein the first voltage command is based on a DC bus voltage value.

7. The power regenerative converter according to claim 1, wherein an output of the adder is equal to the sum of the compensation value and the second voltage command.

8. A power regenerative converter comprising:
   a power conversion unit configured to convert AC power supplied from an AC power supply into DC power and convert DC power into AC power to be supplied as regenerative electric power to the AC power supply;
   an LCL filter including a reactor unit having a plurality of reactors connected in series between the power conversion unit and the AC power supply, and capacitors each having one end connected to a series connection point of the reactors in the reactor unit;
   a drive control unit for controlling the power conversion unit based on a first voltage command, the drive control unit being electrically connected to the power conversion unit; a voltage command compensation unit configured to calculate a compensation value by obtaining a first value based at least in part on an estimated capacitor voltage, the capacitor voltage being a voltage at the series connection point of the reactors, and multiplying the first value by a coefficient to calculate the compensation value, the voltage command compensation unit including an adder to add the compensation value to a second voltage command based on a target current, and a current detecting unit for detecting a current flowing between the power conversion unit and the AC power supply, the AC power supply being a three-phase AC power supply, wherein the voltage command compensation unit is configured to estimate the capacitor voltage based in part on the current detected by the current detecting unit, and the voltage command compensation unit calculates the compensation value in accordance with the estimated capacitor voltage, and wherein the first voltage command is output to the drive control unit.

9. The power regenerative converter according to claim 8, wherein the other ends of the capacitors of the phases are connected to each other.

10. The power regenerative converter according to claim 9, wherein the other ends of the capacitors of the phases are connected to each other.

11. The power regenerative converter according to claim 9, wherein the other end of the capacitor of each phase is connected to the series connection point of the reactors in the reactor unit in another phase.

12. The power regenerative converter according to claim 8, wherein the first voltage command is based on a DC bus voltage value.

13. The power regenerative converter according to claim 8, wherein an output of the adder is equal to the sum of the compensation value and the second voltage command.

* * * * *